United States Patent
Kato et al.

(10) Patent No.: US 10,480,713 B2
(45) Date of Patent: Nov. 19, 2019

(54) OIL CONSOLE DEVICE AND ROTATING MACHINE LUBRICATION SYSTEM

(71) Applicant: MITSUBISHI HEAVY INDUSTRIES COMPRESSOR CORPORATION, Tokyo (JP)

(72) Inventors: Yusuke Kato, Hiroshima (JP); Masahiro Hayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 217 days.

(21) Appl. No.: 15/547,152

(22) PCT Filed: Feb. 18, 2015

(86) PCT No.: PCT/JP2015/054479
§ 371 (c)(1),
(2) Date: Jul. 28, 2017

(87) PCT Pub. No.: WO2016/132488
PCT Pub. Date: Aug. 25, 2016

(65) Prior Publication Data
US 2018/0023762 A1   Jan. 25, 2018

(51) Int. Cl.
*F16N 39/00* (2006.01)
*F04B 39/16* (2006.01)
(Continued)

(52) U.S. Cl.
CPC ....... *F16N 39/002* (2013.01); *B01D 19/0031* (2013.01); *F01D 25/18* (2013.01);
(Continued)

(58) Field of Classification Search
CPC ............. F16N 39/002; F16N 2039/007; B01D 19/0031; F04B 39/16
See application file for complete search history.

(56) References Cited

U.S. PATENT DOCUMENTS 3,191,854 A * 6/1965 Lowler ............... F04C 29/0007
418/85
3,955,945 A * 5/1976 Bauer ..................... F04B 39/16
55/319
(Continued)

FOREIGN PATENT DOCUMENTS

JP   8-42788 A   2/1996
JP   2000-161289 A   6/2000
(Continued)

OTHER PUBLICATIONS

International Search Report (Form PCT/ISA/210) issued in International Application No. PCT/JP2015/054479 dated Jun. 2, 2015, together with an English translation.
(Continued)

*Primary Examiner* — Minh Truong
(74) *Attorney, Agent, or Firm* — Birch, Stewart, Kolasch & Birch, LLP

(57) ABSTRACT

This oil console device (24) is provided with: an oil tank (40) which recovers and stores lubricating oil which has lubricated a bearing portion supporting a rotating body; a pressure reducing fan (71) which is coupled to the oil tank (40) and which reduces the pressure inside the oil tank (40) such that the pressure becomes a negative pressure; an oil mist separator (50) which is provided on the oil tank (40) side of the pressure reducing fan (71) and which captures lubricating oil that has become a mist; and, on the downstream side of the pressure reducing fan (71), a exhaust unit (63s) which vents gas in the oil tank (40) to the outside.

5 Claims, 7 Drawing Sheets

(51) Int. Cl.
  *B01D 19/00* (2006.01)
  *F01D 25/18* (2006.01)
  *F04B 39/02* (2006.01)
  *F16N 7/32* (2006.01)
  *F16N 19/00* (2006.01)
  *F16N 99/00* (2006.01)
  *F01M 13/04* (2006.01)

(52) U.S. Cl.
  CPC .............. *F04B 39/02* (2013.01); *F04B 39/16* (2013.01); *F16N 7/32* (2013.01); *F01M 2013/0438* (2013.01); *F16N 19/00* (2013.01); *F16N 99/00* (2013.01); *F16N 2039/007* (2013.01); *F16N 2270/62* (2013.01)

(56) References Cited

U.S. PATENT DOCUMENTS

| | | | | |
|---|---|---|---|---|
| 4,035,114 A | * | 7/1977 | Sato | F04C 29/026 418/84 |
| 4,359,329 A | * | 11/1982 | Willeitner | B01D 50/002 210/DIG. 5 |
| 4,531,955 A | * | 7/1985 | Cash | B01D 46/0031 55/319 |
| 5,028,220 A | * | 7/1991 | Holdsworth | F04C 29/02 418/2 |
| 5,171,130 A | * | 12/1992 | Kume | F04B 39/04 184/6.16 |
| 5,806,630 A | * | 9/1998 | Bernal | F16N 7/32 184/55.1 |
| 2009/0282985 A1 | * | 11/2009 | Whiteley | B01D 17/0211 96/189 |

FOREIGN PATENT DOCUMENTS

| | | |
|---|---|---|
| JP | 2008-88966 A | 4/2008 |
| JP | 2009-74422 A | 4/2009 |
| JP | 2012-107754 A | 6/2012 |
| JP | 5237433 B2 | 7/2013 |
| JP | 2015-28323 A | 2/2015 |

OTHER PUBLICATIONS

Written Opinion of the International Searching Authority (Form PCT/ISA/237) issued in International Application No. PCT/JP2015/054479 dated Jun. 2, 2015, together with an English translation.

* cited by examiner

OIL CONSOLE DEVICE AND ROTATING MACHINE LUBRICATION SYSTEM

TECHNICAL FIELD

The present invention relates to an oil console device and a rotating machine lubrication system.

BACKGROUND ART

In various rotating machines including a compressor, a turbine, or the like, lubricating oil is supplied to a lubrication target portion which includes a bearing supporting a rotating body or the like and requires lubrication. The lubricating oil which has passed through the lubrication target portion is recovered in a drain. However, since a portion of the lubricating oil is stirred by the rotating body which rotates at a high speed in the lubrication target portion, the portion is made to be mist. Even when the misted lubricating oil can be captured by a filter, a strainer, or the like, a portion of the misted lubricating oil may pass through the filter or the strainer.

In addition, in the rotating machine, steam or gas which is working fluid and the lubrication target portion such as a bearing are separated from each other by a separation gas such as $N_2$ gas introduced into the rotating machine.

In this way, the misted lubricating oil or the separation gas existing in the rotating machine is discharged from a vent (funnel) which is provided in the rotating machine. The vent is lengthened so as to cool and liquefy the misted lubricating oil while the misted lubricating oil passes through the vent and extends upward from the rotating machine. When the misted lubricating oil or the separation gas is discharged to the atmosphere, an opening portion of the tip of the vent is set at a high position from the ground surface in order to decrease influences of the misted lubricating oil or the separation gas with respect to the surrounding.

PTL 1 discloses a configuration in which atmosphere discharge pipes connected to a plurality of bearings of a rotary machine are connected to one atmosphere discharge pipe (vent). In this configuration, a lubricating oil component which is discharged from respective bearings through the plurality of atmosphere discharge pipes is discharged to the atmosphere through only one atmosphere discharge pipe.

In addition, PTL 2 discloses a configuration in which an atmosphere discharge pipe is not provided for each rotating device and a suction device and an atmosphere discharge pipe are provided in a lubricating oil tank.

CITATION LIST

Patent Literature

[PTL 1] Japanese Patent No. 5237433
[PTL 2] Japanese Unexamined Patent Application Publication No. 2009-74422

SUMMARY OF INVENTION

Technical Problem

Meanwhile, for example, in a case where the rotating machine is a large-size device including a compressor and a turbine, the bearing portions which are lubrication target portions are disposed at a plurality of positions largely separated from each other. The lubricating oil or the separation gas which is used in the plurality of bearing portions is returned to an oil tank by an oil console device, and thereafter, the lubricating oil or the separation gas is circulated so as to be supplied to the bearing portion again. In addition, a fan is provided in this oil console device to hold the inside of the oil tank to a negative pressure so as to improve recovery efficiency of the misted lubricating oil or the separation gas.

However, if a large amount of misted lubricating oil flows into the fan, there is a concern that troubles may occur. For example, if the lubricating oil flows into a gap of a rotation system such as a fan, the temperature of the lubricating oil increases, and the lubricating oil deteriorates and is solidified. If the amount of the solidified lubricating oil increases, this becomes a load of the fan. In addition, if the deteriorated lubricating oil or the solidified lubricating oil is returned to the oil tank and is supplied to the bearing portion of the rotating machine, there is a concern that the bearing portion may fail. In order to avoid this failure, it is necessary to increase a frequency of maintenance of the fan, and a maintenance work increases.

The present invention provides an oil console device and a rotating machine lubrication system capable of preventing misted lubricating oil from flowing into the fan side.

Solution to Problem

According to a first aspect of the present invention, there is provided an oil console device, comprising: an oil tank which includes a receiving portion which receives lubricating oil which has lubricated a bearing portion supporting a rotating body and a separation gas supplied to the bearing portion, and stores the lubricating oil which is recovered through the receiving portion; a pressure reducing fan which is connected to the oil tank and reduces a pressure inside the oil tank such that the pressure becomes a negative pressure; an oil mist separator which is provided to be closer to the oil tank side than the pressure reducing fan and captures the misted lubricating oil; an oil transfer pump which transfers the lubricating oil stored in the oil tank; and an exhaust unit which discharges gas inside the oil tank to the outside on a downstream side of the pressure reducing fan.

According to this configuration, it is possible to capture the misted lubricating oil by the oil mist separator before the misted lubricating oil returned to the oil tank reaches the pressure reducing fan. Accordingly, it is possible to prevent the misted lubricating oil from flowing into the pressure reducing fan, deteriorating, and being returned to the inside of the oil tank.

In the oil console device of a second aspect according to the present invention, the oil console device of the first aspect may further include an oil recovery portion which is provided in a gas phase portion of the oil tank, and the oil mist separator may be provided in the oil recovery portion.

According to this configuration, since the oil mist separator is disposed in the oil recovery portion provided in the gas phase portion of the oil tank, it is possible to return the lubricating oil captured by the oil mist separator to the inside of the oil tank by only falling of the lubricating oil due to the own weight. Accordingly, a complicated structure for returning the lubricating oil captured by the oil mist separator to the oil tank is not necessary.

In the oil console device of a third aspect according to the present invention, the oil recovery portion may be provided at a position protruding from an upper portion of the oil tank.

According to this configuration, it is possible to provide the oil mist separator without being limited by the size of the gas phase portion of the oil tank. Accordingly, it is possible to provide the oil mist separator which has a sufficient size to sufficiently collect the misted lubricating oil and decrease a resistance with respect to the flow of the separation gas.

In the oil console device of a fourth aspect according to the present invention, the oil console device of the first aspect may further include an oil recovery portion which is provided in a pipe which is connected to an upper portion of the oil tank and the oil mist separator may be provided in the oil recovery portion.

According to this configuration, since the oil mist separator is provided in the pipe connected to the upper portion of the oil tank, it is possible to obtain a degree of freedom with respect to the size or the installation position of the oil mist separator.

In the oil console device of a fifth aspect according to the present invention, the oil console device according to any one of the first to fourth aspects may further include a plurality of the pressure reducing fans; and an exhaust switching portion which switches a discharge destination of the gas inside the oil tank to any one of the plurality of pressure reducing fans.

According to this configuration, even when one of pressure reducing fans fails, it is possible to switch the discharge destination of the gas to a pressure reducing fan which does not fail by the exhaust switching portion. As a result, it is possible to continuously operate the oil console device and it is possible to increase the availability of the facility.

In the oil console device of a sixth aspect according to the present invention, the oil console device of the fifth aspect may further include a tank pressure detection section which detects a pressure inside the oil tank.

According to this configuration, it is possible to detect abnormality of a pressure state inside the oil tank.

In the oil console device of a seventh aspect according to the present invention, in the oil console device of the sixth aspect, in a case where a pressure inside the oil tank detected by the tank pressure detection section exceeds a predetermined threshold value, the exhaust switching portion may switch the discharge destination of the gas inside the oil tank.

According to this configuration, it is possible to continuously operate the oil console device. In addition, when a trouble occurs, it is possible to prevent the pressure inside the oil tank from excessively increasing.

In the oil console device of an eighth aspect according to the present invention, the oil console device according to any one of the first to sixth aspects may further include an emergency opening valve which supplies the gas inside the oil tank to the exhaust unit in a case where the pressure inside the oil tank exceeds the predetermined threshold value.

According to this configuration, it is possible to prevent the pressure inside the oil tank from excessively increasing.

According to a ninth aspect of the present invention, there is provided a rotating machine lubrication system, including: a rotating machine main body to which lubricating oil and a separation gas are supplied and which includes a bearing portion supporting a rotating body; and the oil console device according to any one of the first to eighth aspects which is connected to the rotating machine main body and recovers the lubricating oil discharged from the rotating machine main body, in which a discharge portion which discharges gas recovered from the inside of the rotating machine main body along with the lubricating oil to the outside is only the discharge portion which is provided in the oil console device.

According to this configuration, the misted lubricating oil recovered from the rotating machine main body is discharged from only the oil console device to the outside. That is, it is possible to discharge gas such as the misted lubricating oil via the oil console device without providing a vent for discharging the misted lubricating oil in the rotating machine main body. Accordingly, it is not necessary to provide the vent for directly discharging the gas to the outside, in the rotating machine main body. Therefore, it is possible to compactly install the oil console device or the rotating machine.

Advantageous Effects of Invention

According to the above-described oil console device and rotating machine lubrication system, it is possible to prevent the misted lubricating oil from flowing into the fan side.

DESCRIPTION OF EMBODIMENTS (First Embodiment)

Figure 1:
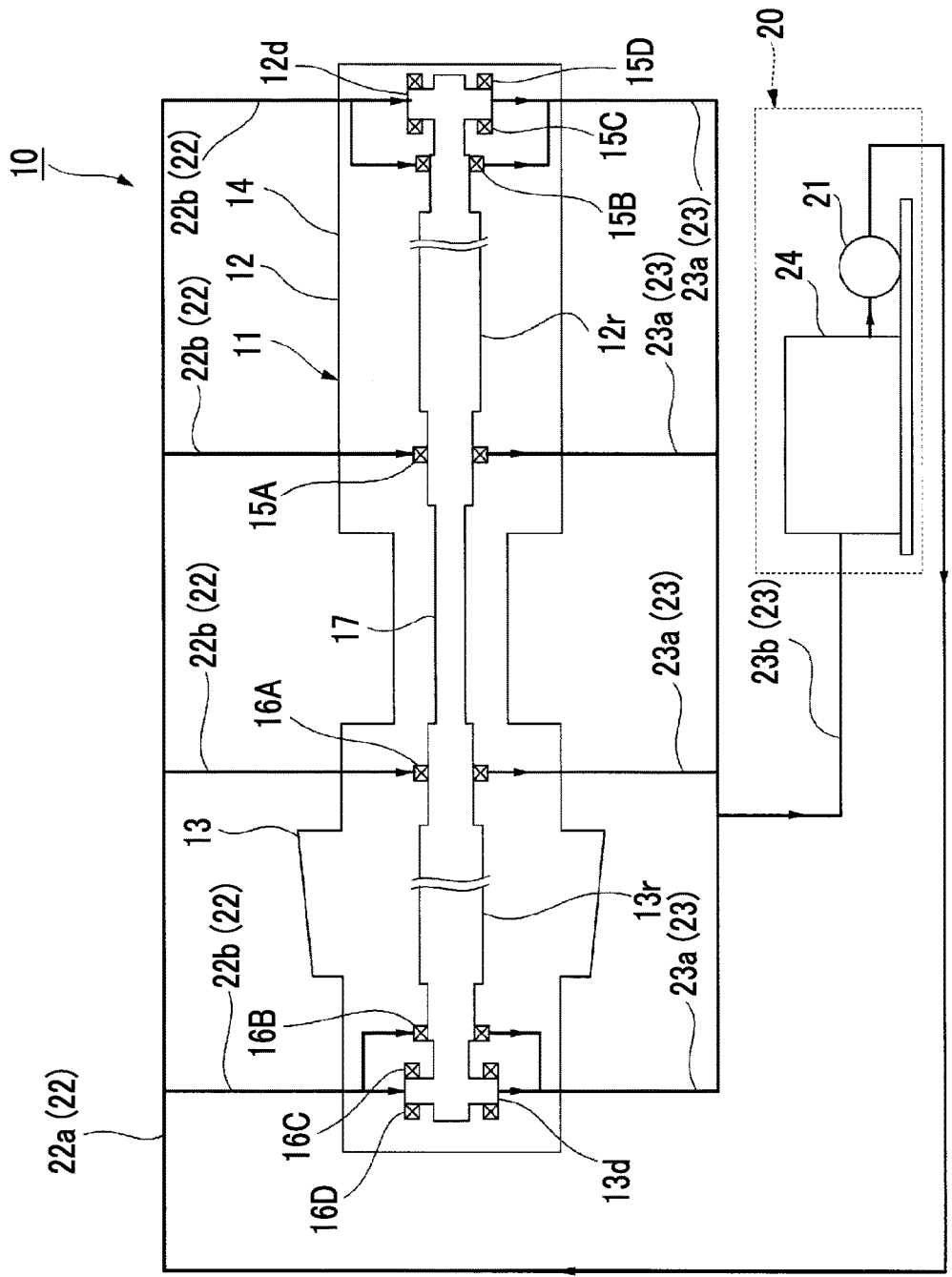
FIG. 1 is a view showing the overall configuration of a rotating machine lubrication system in an embodiment of the present invention.

As shown in FIG. 1, a rotating machine lubrication system 10 of the present embodiment includes a rotating machine main body 11 and an oil console device 20.

For example, the rotating machine main body 11 includes a steam turbine 13 and a compressor 12 such as a centrifugal compressor driven by the steam turbine 13.

The steam turbine 13 includes a turbine rotor (rotating body) 13r which is rotatably supported in a casing 14. Both ends of the turbine rotor 13r are rotatably supported around a central axis of the turbine rotor 13r by radial bearings 16A and 16B. A thrust collar 13d which is enlarged toward the outside in the radial direction is formed on one end of the turbine rotor 13r. Thrust bearings 16C and 16D are provided on both side of the thrust collar 13d, and the replacement of the turbine rotor 13r is restricted in the direction of the central axis while the turbine rotor 13r is rotatably supported around the central axis.

The compressor 12 includes a compressor rotor (rotating body) 12r which is rotatably supported in the casing 14. The compressor rotor 12r is connected to the turbine rotor 13r of the steam turbine 13 via a connection shaft 17. Both end portions of the compressor rotor 12r are rotatably supported around the central axis of the compressor rotor 12r by radial bearings 15A and 15B. Moreover, a thrust collar 12d which is enlarged toward the outside in the radial direction is formed on one end of the compressor rotor 12r. Thrust bearings 15C and 15D are provided on both sides of the thrust collar 12d, and the replacement of the compressor rotor 12r is restricted in the direction of the central axis while the compressor rotor 12r is rotatably supported around the central axis.

Here, in descriptions below, the radial bearings (bearing portions) 16A and 16B and thrust bearings (bearing portions) 16C and 16D included in the steam turbine 13 and radial bearings (bearing portions) 15A and 15B and thrust bearings (bearing portions) 15C and 15D included in the compressor 12 are simply referred to bearing portions 16A to 16D and 15A to 15D.

In the rotating machine main body 11, the turbine rotor 13r is rotationally driven by steam which is fed from the outside to the steam turbine 13. The rotation of the turbine rotor 13r is transmitted to the compressor rotor 12r of the compressor 12 via the connection shaft 17. The compressor rotor 12r of the compressor 12 rotates, and the compressor 12 takes in air or the like as a working fluid and generates a compressed fluid. Moreover, here, the application of the compressed fluid generated by the compressor 12 is not limited at all.

Figure 2:
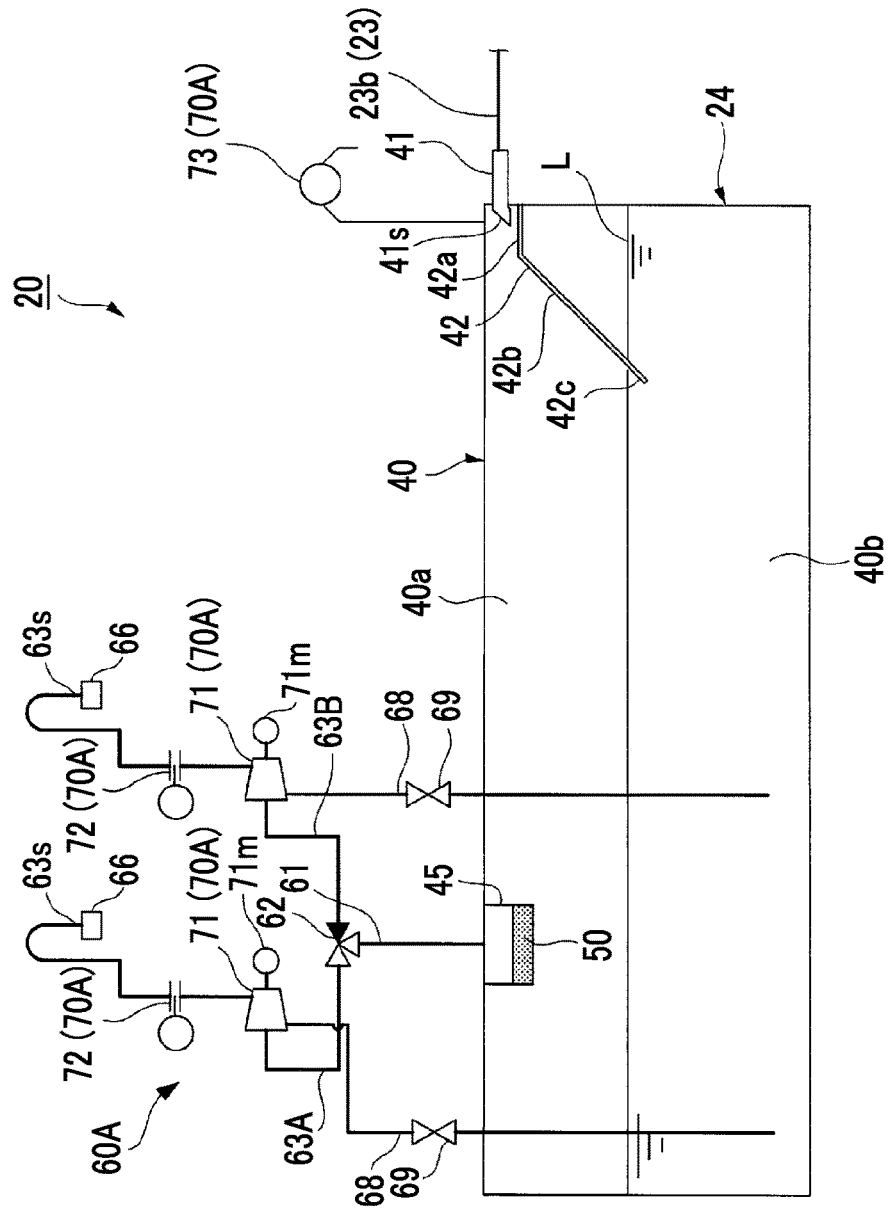
FIG. 2 is a view showing a portion of a configuration of an oil console device in a first embodiment of the present invention.

The oil console device 20 supplies the lubricating oil to the bearing portions 15A to 15D and 16A to 16D while circulating the lubricating oil, and thereby, lubrication of these is achieved. As shown in FIG. 1, the oil console device 20 includes an oil supply source 21, an oil supply passage 22, a recovery passage 23, and a recovery portion 24. In addition, as shown in FIG. 2, the oil console device 20 includes an oil tank 40, an oil mist separator 50, an exhaust system 60A, and a tank pressure regulating section 70A as the recovery portion 24.

The oil supply source 21 feeds lubricating oil inside the oil tank 40 to the oil supply passage 22. The oil supply source 21 of the present embodiment includes, as configurations not shown, an oil transfer pump which transfers the lubricating oil inside the oil tank 40, an oil cooler which cools the lubricating oil fed from the oil transfer pump, an oil filter which collects dusts or the like mixed in the lubricating oil discharged from the oil cooler, a pressure regulating valve which adjusts the pressure of the lubricating oil passing through the oil filter, or the like.

The oil supply passage 22 includes a main supply pipe 22a and a plurality of sub supply pipes 22b. The main supply pipe 22a is connected to the oil supply source 21. The main supply pipe 22a is divided into a plurality of pipes, and thereby, the sub supply pipes 22b are formed. Each sub supply pipe 22b is connected to each of the bearing portions 15A to 15D and 16A to 16D.

Accordingly, the lubricating oil discharged from the oil supply source 21 is supplied from the main supply pipe 22a of the oil supply passage 22 to the bearing portions 15A to 15D and 16A to 16D via each sub supply pipe 22b. Therefore, the lubrication of the bearing portions 15A to 15D and 16A to 16D is realized.

The recovery passage 23 includes a plurality of sub drain pipes 23a and a main drain pipe 23b. Each of the sub drain pipes 23a is connected to each of the bearing portions 15A to 15D and 16A to 16D. The plurality of sub drain pipes 23a are connected to the main drain pipe 23b. Accordingly, the lubricating oil which has passed through the bearing portions 15A to 15D and 16A to 16D flows into the main drain pipe 23b via each sub drain pipe 23a. The recovered lubricating oil is returned to the oil tank 40 of the recovery portion 24 through the main drain pipe 23b.

In this case, the lubricating oil misted in the bearing portion 15A to 15D and 16A to 16D and the liquid state lubricating oil therein are returned to the oil tank 40 via the sub drain pipes 23a and the main drain pipe 23b.

In order to prevent steam or gas which is a working fluid of the rotating machine main body 11 from entering the bearing portions 15A to 15D and 16A to 16D which are lubrication target portions, a separation gas such as $N_2$ gas is introduced into the casing 14 of the rotating machine main body 11. A portion of the separation gas is also returned from the bearing portions 15A to 15D and 16A to 16D to the oil tank 40 via each sub drain pipe 23a and the main drain pipe 23b.

The oil tank 40 recovers and stores the lubricating oil which has lubricated the bearing portions 15A to 15D and 16A to 16D. As shown in FIG. 2, the oil tank 40 is hollow and a drain nozzle 41 is provided on the upper portion of the side surface of the oil tank 40. The drain nozzle 41 is connected to the main drain pipe 23b. A nozzle tip portion 41s of the drain nozzle 41 is open downward in the oil tank 40. The drain nozzle 41 feeds the liquid state lubricating oil, the misted lubricating oil, and the separation gas recovered via the main drain pipe 23b into the oil tank 40.

A degassing tray 42 is provided in the oil tank 40, and the degassing tray 42 is a receiving portion which receives the lubricating oil after lubricating the bearing portions 16A to 16D and 15A to 15D and the separation gas supplied to the bearing portions 16A to 16D and 15A to 15D. In the degassing tray 42, a horizontal portion 42a which approximately horizontally extends from the inner wall surface of the oil tank 40 toward the inside of the oil tank 40 and an inclined portion 42b which extends to be inclined downward from one end of the horizontal portion 42a toward the inside of the oil tank 40 are integrally formed with each other. Preferably, the lower end portion 42c of the inclined portion 42b is positioned in the vicinity of a liquid level L of the lubricating oil stored in the oil tank 40 or is positioned at a lower position than the liquid level L.

The lubricating oil discharged from the drain nozzle 41 flows from the horizontal portion 42a of the degassing tray 42 along the inclined portion 42b and flows into the liquid phase of the lubricating oil stored in the oil tank 40. In this way, the lubricating oil flows along the inclined portion 42b, and it is possible to prevent bubbling of the lubricating oil in the oil tank 40.

In addition, the misted lubricating oil and the separation gas fed from the nozzle tip portion 41s of the drain nozzle 41 into the oil tank 40 drift on a gas phase portion 40a which is a region positioned above the liquid level L of the liquid lubricating oil stored in the lower portion of the oil tank 40. In addition, a region below the liquid level L of the lubricating oil inside the oil tank 40 is referred to a liquid phase portion 40b which is a portion in which the lubricating oil is stored.

An oil recovery portion 45 which is provided in the gas phase portion of the oil tank 40 is formed on the upper portion of the oil tank 40. The oil recovery portion 45 of the present embodiment does not protrude from the upper surface of the oil tank 40, and the entire oil recovery portion 45 is accommodated in the oil tank 40. The oil recovery portion 45 forms a space which is partitioned to allow the gas phase portion 40a inside the oil tank 40 and the connection pipe 61 of the exhaust system 60A described later to communicate with each other. Specifically, the oil recovery portion 45 is formed in a cylindrical shape. The bottom portion of the oil recovery portion 45 is open to the gas phase portion 40a in the oil tank 40, faces the liquid surface (oil surface), and the upper portion of the oil recovery portion 45 is open to the connection pipe 61.

Figure 3:
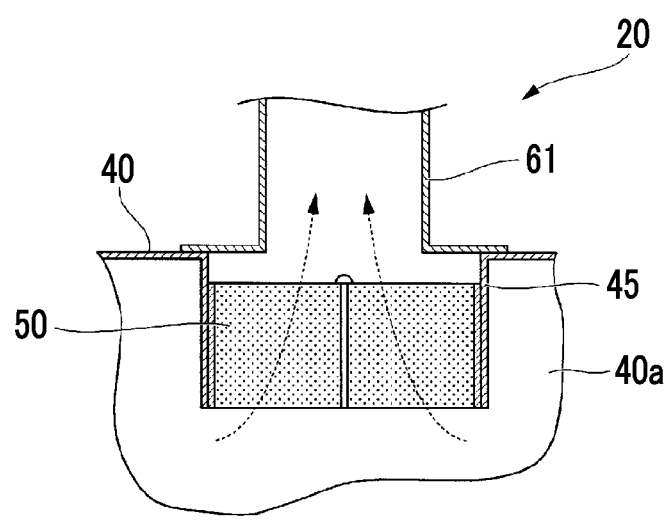
FIG. 3 is an enlarged view showing configurations of an oil recovery portion and an oil mist separator in the first embodiment of the present invention.

Typically, the oil mist separator 50 has a function which passes gas while capturing fine oil droplets included in oil mist which is misted lubricating oil. The oil mist separator 50 is a filter-shaped separator having fine pores such as a nonwoven fabric or a wire mesh or a fine passage. The oil mist separator 50 is variously called to a mist eliminator or a mist catcher. The oil mist separator 50 is provided in the oil recovery portion 45. As shown in FIG. 3, the oil mist separator 50 of the present embodiment is a columnar filter in which the upper surface and the lower surface are open. The oil mist separator 50 is fixed to the inner peripheral surface of the oil recovery portion 45, and gas can vertically flow through the oil mist separator 50. Accordingly, the oil mist separator 50 takes in the gas inside oil tank 40 from the lower surface of the oil mist separator 50 which is a surface facing the liquid surface in the oil recovery portion 45. The oil mist separator 50 discharges the gas, which is taken from the upper surface which is a surface facing the opening of the connection pipe 61 described later, to the upper portion inside the oil recovery portion 45.

The exhaust system 60A is a discharge portion which discharges the lubricating oil and the recovered gas from the bearing portions 16A to 16D and 15A to 15D in the rotating machine main body 11 to the outside. In the present embodiment, the discharge portion is provided in only the oil console device 20. That is, in the present embodiment, if the discharge portion such as a vent which is typically provided in the lubrication target portion of the rotating machine main body 11 of the bearing portions 16A to 16D and 15A to 15D or the like is not provided or closed, the function of the discharge portion is not exerted. The exhaust system 60A configures a vent which discharges gas such as the misted lubricating oil and the separation gas returned to the oil tank 40 to the outside via the oil recovery portion 45. As shown in FIG. 2, the exhaust system 60A includes the connection pipe 61, a three-way valve (exhaust switching portion) 62, a main system 63A, and a sub system 63B.

One end of the connection pipe 61 is connected to the top portion of the oil recovery portion 45 and the other end thereof is connected to the three-way valve 62.

The three-way valve 62 connects the main system 63A and the sub system 63B to each other. The three-way valve 62 can switch a connection destination of the connection pipe 61 between the main system 63A and the sub system 63B. In this embodiment, normally, when a failure or the like occurs in the device configuring the main system 63A, the connection pipe 61 connected to the main system 63A is connected to the sub system 63B by switching the three-way valve 62.

Each of the main system 63A and the sub system 63B extends upward from the oil recovery portion 45, and gas is discharged from a tip portion (exhaust unit) 63s toward the outside. Each of the tip portions 63s of the main system 63A and the sub system 63B is folded in a U shape and is open downward. The tip portion 63s is positioned on the downstream side of a vapor fan 71 of the tank pressure regulating section 70A described later. The main system 63A and the sub system 63B discharge gas such as the misted lubricating oil or the separation gas inside the oil tank 40 from the tip portions 63s to the outside. A filter 66 which prevents flames from spreading in a case where flames occur is provided in each of the tip portions 63s of the main system 63A and the sub system 63B. The filter 66 may further include an air breather or the like which captures the misted lubricating oil.

The tank pressure regulating section 70A includes the vapor fan (pressure reducing fan) 71, a flow rate regulating section (pressure regulating section) 72, and a tank pressure detection section 73. The vapor fan 71 and the flow rate regulating section 72 are provided in each of the main system 63A and the sub system 63B. The vapor fan 71 is driven by a motor 71m. The vapor fan 71 generates a flow from the upstream side on the oil recovery portion 45 side toward the downstream side in each of the main system 63A and the sub system 63B, and a negative pressure which is the lower pressure than the pressure inside the oil tank 40 is generated in each of the main system 63A and the sub system 63B.

Due to the negative pressure generated by the vapor fan 71, a gas (a gas phase) inside the oil tank 40 is sucked out from the inside of the oil tank 40 to the main system 63A or the sub system 63B via the oil recovery portion 45. The misted lubricating oil and the separation gas are included in the oil tank 40 as gas. The gas passes through the oil mist separator 50 provided in the oil recovery portion 45, and a large amount of the misted lubricating oil in the gas is separated from the separation gas to be recovered. The misted lubricating oil captured by the oil mist separator 50 is liquefied. The liquefied lubricating oil falls on the liquid phase in the oil tank 40 positioned below by the own weight of the liquefied lubricating oil.

The gas which is sucked out from the oil recovery portion 45 by the vapor fan 71 and passes through the oil mist separator 50 is discharged from the tip portion 63s of the main system 63A to the outside.

The gas inside the oil tank 40 is sucked out from the oil recovery portion 45 to the main system 63A or the sub system 63B due to the negative pressure generated by the vapor fan 71, and as a result, the pressure inside the oil tank 40 decreases. That is, the vapor fans 71 generate a differential pressure between the recovery passage 23 and the oil tank 40 connected to the bearing portions 15A to 15D and 16A to 16D, and the bearing portions 15A to 15D and 16A to 16D of the rotating machine main body 11. Due to this differential pressure, it is possible to effectively suck out the liquid lubricating oil, the misted lubricating oil, and the separation gas from the bearing portions 15A to 15D and 16A to 16D of the rotating machine main body 11 to the oil tank 40 via the recovery passage 23.

A return pipe 68 for returning the lubricating oil collected inside the vapor fan 71 to the inside of the oil tank 40 is connected to the vapor fan 71. An opening-closing valve 69 is provided in the return pipe 68. It is possible to return the lubricating oil collected in the vapor fan 71 to the oil tank 40 by opening the opening-closing valve 69. The return pipe 68 is connected to the liquid phase portion 40b below the liquid surface of the oil tank 40, and it is possible to open the opening-closing valve 69 even during the operation.

The flow rate regulating section 72 is provided in the downstream side of the vapor fan 71 in each of the main system 63A and the sub system 63B. For example, the flow rate regulating section 72 of the present embodiment can be configured of an orifice or a needle valve. The flow rate regulating section 72 regulates the flow rate of the gas sucked out from the oil recovery portion 45 by the main system 63A and the sub system 63B. For example, in the flow rate regulating section 72, an opening degree of the flow rate regulating section 72 is set when the rotating machine lubrication system 10 is installed, and the opening degree is fixed during the operation.

The tank pressure detection section 73 is provided above the oil tank 40. For example, as the tank pressure detection section 73 of the present embodiment, a differential pressure transmitter which detects a differential pressure between a gas phase pressure inside the oil tank 40 and the atmospheric pressure is used.

In the oil console device 20, the three-way valve 62, the motor 71m of the vapor fan 71, or the like is manually operated according to the detection result of the pressure (the differential pressure between the pressure inside the oil tank 40 and the atmospheric pressure) inside the oil tank 40 detected by the tank pressure detection section 73 and the operating state of the oil console device 20 is regulated. For example, specifically, in a case where the pressure (differential pressure) inside the oil tank 40 detected by the tank pressure detection section 73 exceeds a predetermined threshold value, the opening degree of the flow rate regulating section 72 is regulated.

As the threshold value of the present embodiment, there is an upper limit threshold value which is a threshold value in a case where the pressure inside the oil tank 40 excessively decreases and the separation gas is excessively sucked from the rotating machine main body (in a case where the negative pressure excessively increases). In addition, as another threshold value, there is a lower limit threshold value which is a threshold value in a case where the pressure inside the oil tank 40 excessively increases and the separation gas inside the oil tank 40 flows to the rotating machine main body 11 side (in a case where the negative pressure excessively decreases or in a case where a positive pressure is generated). Accordingly, in a case where the pressure (differential pressure) inside the oil tank 40 detected by the tank pressure detection section 73 exceeds a preset upper limit threshold value, the flow rate regulating section 72 is throttled, and in a case where the pressure exceeds the lower limit threshold value, the orifice or the like which is the flow rate regulating section 72 is opened.

Moreover, in a case where even when the opening degree of the flow rate regulating section 72 is regulated, the pressure inside the oil tank 40 detected by the tank pressure detection section 73 exceeds a preset threshold value, it can be determined that a failure of the vapor fan 71 or the flow rate regulating section 72, clogging of the oil mist separator 50, or the like occurs. In a case where it is determined that the vapor fan 71 or the flow rate regulating section 72 fails, the three-way valve 62 is switched and the motor 71m of the vapor fan 71 of the sub system 63B is operated, and it is possible to suck the gas sucked out from the oil recovery portion 45 through the sub system 63B. In a case where it is determined that the oil mist separator 50 is clogged, replacement or cleaning of the oil mist separator 50 is performed.

As described above, according to the oil console device 20 and the rotating machine lubrication system 10, the oil tank 40 in which the lubricating oil which has lubricated the bearing portions 15A to 15D and 16A to 16D is stored, the vapor fan 71 which is connected to the oil tank 40 and reduces the pressure inside the oil tank 40 such that the pressure becomes the negative pressure, and the oil mist separator 50 which is provided between the oil tank 40 and the vapor fan 71 and captures the misted lubricating oil are provided.

According to this configuration, it is possible to return the misted lubricating oil and the separation gas to the oil tank 40 along with the lubricating oil which has lubricated the bearing portions 15A to 15D and 16A to 16D, by the negative pressure generated by the vapor fan 71. Before the misted lubricating oil returned to the oil tank 40 reaches the vapor fan 71, it is possible to capture the misted lubricating oil by the oil mist separator 50. Accordingly, it is possible to prevent the misted lubricating oil from flowing into the vapor fan 71, deteriorating, and being returned to the inside of the oil tank 40. Accordingly, it is possible to prevent a large amount of misted lubricating oil from flowing into the vapor fan 71 side and it is possible to prevent troubles due to deteriorated lubricating oil from occurring in the rotating machine main body 11.

In addition, the oil mist separator 50 is provided in the oil recovery portion 45 facing the gas phase portion 40a of the oil tank 40. Accordingly, it is possible to return the lubricating oil captured by the oil mist separator 50 to the inside of the oil tank 40 by only falling of the lubricating oil due to the own weight. Accordingly, a complicated structure for returning the lubricating oil captured by the oil mist separator 50 to the oil tank 40 is not necessary, and it is possible to easily return the misted lubricating oil to the liquid phase portion 40b of the oil tank 40.

In addition, the recovered misted lubricating oil is captured by the oil mist separator 50, it is possible to clean the exhaust from the oil console device 20, and it is possible to decrease the amount of the misted lubricating oil discharged to the outside. Accordingly, it is possible to decrease the discharged amount of the misted lubricating oil and it is possible to reduce the number of the installed vents. In addition, since it is possible to decrease the discharged amount of the lubricating oil, it is possible to save the lubricating oil or decrease an operation of replenishing the lubricating oil.

In addition, the pressure inside the oil tank 40 is set to a negative pressure by the vapor fan 71, and it is possible to suck the separation gas, which is supplied to the bearing portions 15A to 15D and 16A to 16D of the rotating machine main body 11, along with the lubricating oil so as to recover the separation gas and the lubricating oil. In addition, the recovered misted lubricating oil or the separation gas is discharged from the main system 63A and the sub system 63B provided in only the oil console device 20 to the outside. That is, it is possible to discharge the gas such as the misted lubricating oil or the separation gas via the oil tank 40 without providing the vent for discharging the misted lubricating oil or the separation gas for each of the bearing portions 15A to 15D and 16A to 16D of the rotating machine main body 11. Accordingly, it is not necessary to provide the vent for directly discharging the gas from the bearing portions 15A to 15D and 16A to 16D to the outside, in the rotating machine main body 11. For this reason, for example, even in a case where facilities including the rotating machine main body 11 are shipboard facilities or offshore facilities in which an installation space is limited and it is difficult to install high vents having long lengths or filters for processing the misted lubricating oil, it is possible to compactly install the oil console device 20 or the rotating machine lubrication system 10 capable of effectively processing the misted lubricating oil.

Particularly, in the present embodiment, the oil console device 20 has the structure in which one recovery portion 24 is connected to the plurality of rotating machine main bodies 11 such as the steam turbine 13 and the compressor 12, it is possible to more compactly install a large-sized rotating machine lubrication system 10.

In addition, it is possible to suck the gas from the oil tank 40 by the negative pressure generated in the vapor fan 71, and it is possible to capture the misted lubricating oil included in the gas by the oil mist separator 50 which is provided between the oil tank 40 and the vapor fan 71. Accordingly, even when a fine mesh element is used as the oil mist separator 50, it is possible to forcibly suck the gas by the vapor fan 71 so as to be circulated. As a result, it is possible to effectively recover the misted lubricating oil which is not completely recovered and is discharged to the atmosphere in the related art, by the oil mist separator using a fine mesh element, and it is possible to further decrease the discharged amount of the misted lubricating oil.

In addition, it is possible to set pressures around the bearing portions 15A to 15D and 16A to 16D inside the rotating machine main body 11 to a negative pressure by the negative pressure generated in the vapor fan 71. Accordingly, it is possible to prevent leakage of the lubricating oil in the seal portions, the flange sections, or the like of the bearing portions 15A to 15D and 16A to 16D.

In addition, since the flow rate regulating section 72 is provided on the downstream side of the vapor fan 71, it is possible to regulate the pressure (negative pressure) inside the oil tank 40. Accordingly, when the recovery portion 24 is installed, it is possible to appropriately set the pressure inside the oil tank 40 so as to operate the oil tank 40.

Since the tank pressure detection section 73 is provided, it is possible to detect abnormality of a pressure state inside the oil tank 40. That is, it is possible to detect a case where the failure of the vapor fan 71 or the flow rate regulating section 72 or the clogging of the oil mist separator 50 occurs and abnormality such as an increase in the pressure inside the oil tank 40 occurs. In addition, inversely, it is possible to detect a state where the pressure inside the oil tank 40 decreases and the misted lubricating oil or the separation gas is excessively sucked from the bearing portions 15A to 15D and 16A to 16D.

In addition, the recovery portion 24 includes two exhaust systems 60A such as the main system 63A and the sub system 63B, and it is possible to switch the discharge destination of the gas inside the oil tank 40 to any one of the two exhaust systems 60A by the three-way valve 62. Accordingly, even in a case where the vapor fan 71 or the flow rate regulating section 72 disposed in the main system 63A fails, it is possible to switch the discharge destination of the gas from the main system 63A to the sub system 63B, that is, to the vapor fan 71 or the flow rate regulating section 72 which does not fail by the three-way valve 62. As a result, it is possible to continuously operate the oil console device 20 and the rotating machine lubrication system 10, and it is possible to increase availability of the facility.

(Second Embodiment)

Next, a second embodiment of the oil console device and the rotating machine lubrication system of the present invention will be described. With respect to the oil console device and the rotating machine lubrication system of the first embodiment, in the oil console device and the rotating machine lubrication system described in the second embodiment, only some configurations such as the disposition of the oil mist separator are different. Accordingly, in descriptions of the second embodiment, the same reference numerals are assigned to the same portions as those of the first embodiment, and overlapping descriptions thereof are omitted. That is, descriptions with respect to the overall configuration of the rotating machine lubrication system 10 and the configurations of the rotating machine main body 11 common to the descriptions of the first embodiment are omitted.

Figure 4:
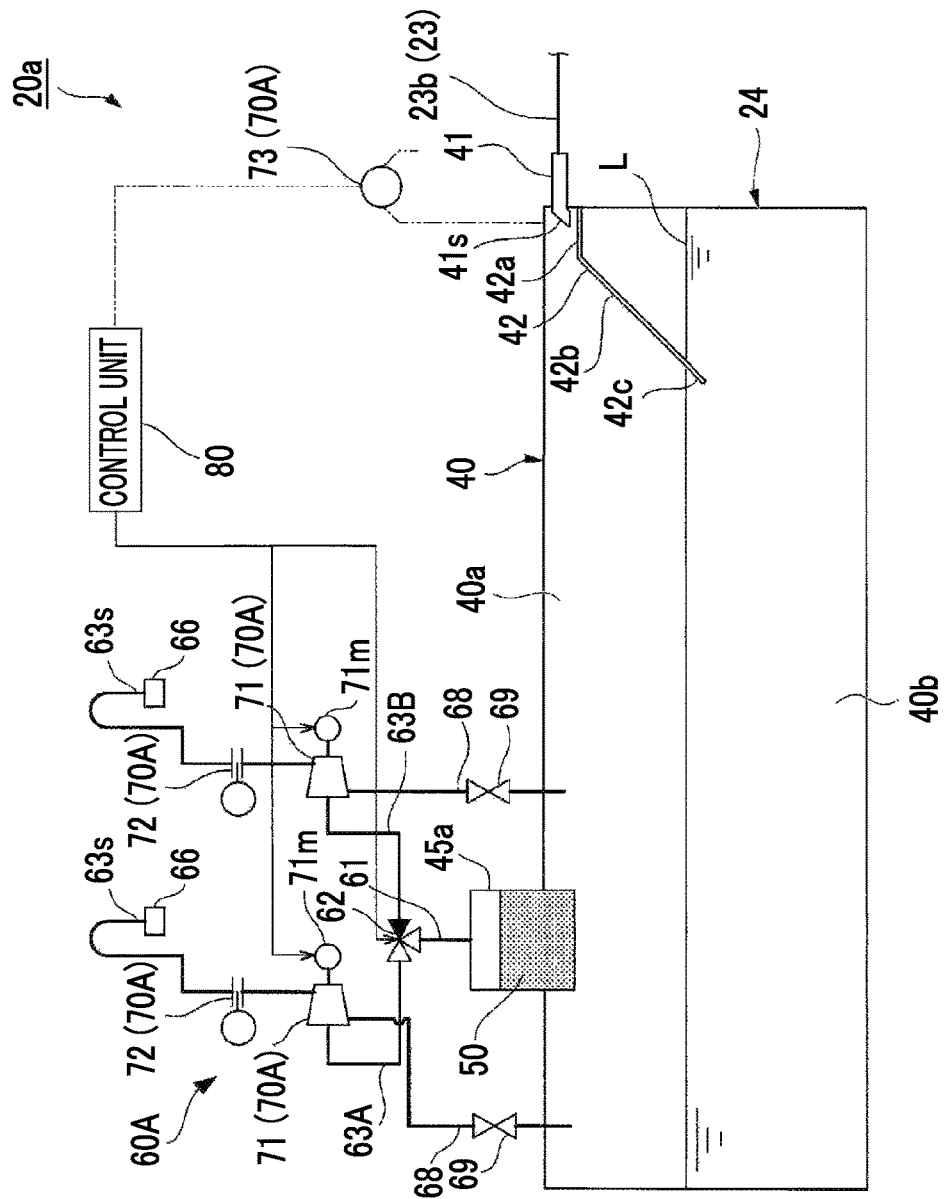
FIG. 4 is a view showing a portion of a configuration of an oil console device in a second embodiment of the present invention.

As shown in FIG. 4, in addition to the configurations described in the second embodiment, in an oil console device 20a of the first embodiment, a control unit 80 may be provided, which controls the switching operation of the three-way valve 62 and start and stop of the motor 71m of the vapor fan 71 according to the detection results of the tank pressure detection section 73. In addition, in the oil console device 20a, an oil recovery portion 45a is provided at a position protruding from the upper portion of the oil tank 40.

Figure 5:
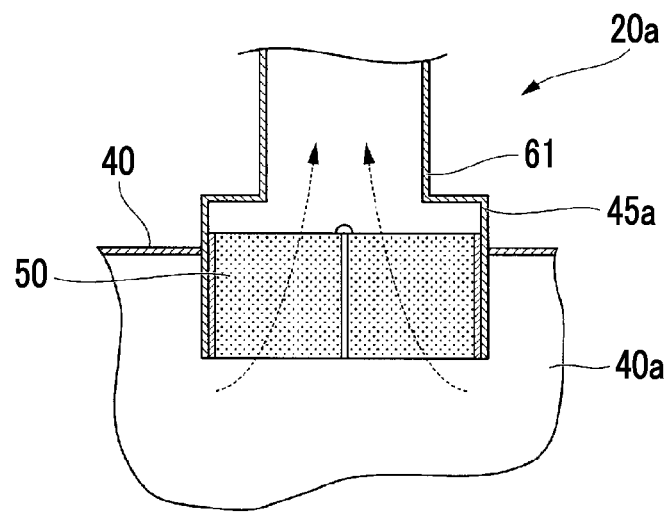
FIG. 5 is an enlarged view showing configurations of an oil recovery portion and an oil mist separator in the second embodiment of the present invention.

As shown in FIG. 5, the oil recovery portion 45a of the second embodiment is provided so as to protrude from the upper portion of the oil tank 40 while facing the gas phase portion 40a of the oil tank 40. Accordingly, the oil mist separator 50 is disposed in the oil recovery portion 45a across the upper portion of the oil tank 40 and the inside of the oil tank 40.

In a case where a differential pressure between the pressure inside the oil tank 40 detected by the tank pressure detection section 73 and the atmospheric pressure exceeds a predetermined threshold value, the control unit automatically switches the three-way valve 62. In addition, in a case where the differential pressure detected by the tank pressure detection section 73 exceeds a predetermined threshold value, the control unit 80 stops the motor 71m of the vapor fan 71 of the main system 63A and starts the motor 71m of the vapor fan 71 of the sub system 63B. If the vapor fan 71 of the sub system 63B is driven by the control unit 80, gas inside the oil tank 40 is sucked into the sub system 63B via the connection pipe 61 by a negative pressure generated by the vapor fan 71 of the sub system 63B. In this way, in a case where the failure of the vapor fan 71 or the flow rate regulating section 72 or like occurs, it is possible to automatically perform switching from the main system 63A to the sub system 63B.

In addition, in a case where the pressure (differential pressure) inside the oil tank 40 detected by the tank pressure detection section 73 exceeds a predetermined threshold value, the rotation speed of the motor 71m of the vapor fan 71 may be regulated by the control unit 80.

As described above, according to the oil console device 20a and the rotating machine lubrication system 10, it is possible to provide the oil mist separator 50 without being limited by the size of the gas phase portion 40a of the oil tank 40. Accordingly, it is possible to provide the oil mist separator 50 which sufficiently collects oil mist and has a sufficient size to decrease a resistance with respect to the flow of the separation gas.

In addition, similarly to the first embodiment, it is possible to return the lubricating oil captured by the oil mist separator 50 to the inside of the oil tank 40 by only the falling of the lubricating oil due to the own weight. Accordingly, a complicated structure for returning the lubricating oil captured by the oil mist separator 50 to the oil tank 40 is not necessary, and it is possible to easily return the misted lubricating oil to the liquid phase portion 40b of the oil tank 40.

In addition, similarly to the first embodiment, it is possible to recover the misted lubricating oil and the separation gas to the oil tank 40 along with the lubricating oil which has lubricated the bearing portions 15A to 15D and 16A to 16D, by the negative pressure generated by the vapor fan 71. Since the recovered misted lubricating oil is captured by the oil mist separator 50, it is possible to clean the exhaust from the oil console device 20a. In this way, it is possible to decrease the discharged amount of the misted lubricating oil or the separation gas. Moreover, since it is not necessary to provide the vent for directly discharging the misted lubricating oil or the separation gas from the rotating machine main body 11 to the outside, it is possible to reduce a cost of the facility.

Moreover, in a case where the pressure inside the oil tank 40 detected by the tank pressure detection section 73 exceeds a predetermined threshold value, it is possible to automatically switch the discharge destination of the gas inside the oil tank 40 between the main system 63A and the sub system 63B by the control unit 80. Accordingly, it is possible to continuously operate the oil console device 20a and it is possible to improve availability of the rotating machine lubrication system 10. In addition, when a trouble occurs, it is possible to prevent the pressure of the exhaust system 60A or the pressure inside the oil tank 40 from excessively increasing.

(Modification Example of Second Embodiment)

The disposition of the oil recovery portion in the second embodiment is not limited to the above configuration.

Figure 6:
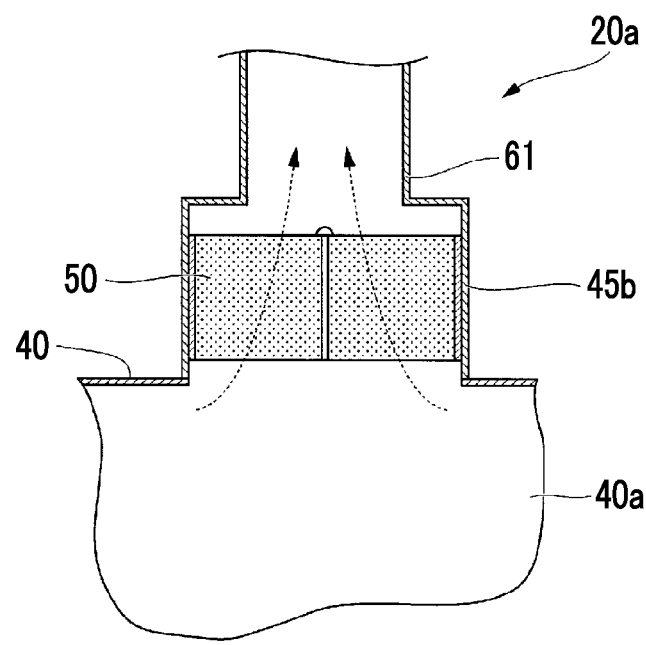
FIG. 6 is an enlarged view showing configurations of an oil recovery portion and an oil mist separator in a modification example of the second embodiment of the present invention.

As shown in FIG. 6, an oil recovery portion 45b of a modification example of the second embodiment is provided to completely protrude from the upper surface of the oil tank 40. That is, the oil recovery portion 45b is not provided inside the oil tank 40.

In this case, the oil mist separator 50 may be disposed to be completely closer to the upper portion which is the opening side of the connection pipe 61 than the upper portion of the oil tank 40.

According to this configuration, it is possible to provide the oil mist separator 50 without disposing the oil mist separator 50 in the oil tank 40.

(Third Embodiment)

Next, a third embodiment of the oil console device and the rotating machine lubrication system of the present invention will be described. With respect to the oil console device and the rotating machine lubrication system of the second embodiment, in the oil console device and the rotating machine lubrication system described in the third embodiment, only the shapes of the oil recovery portion and the oil mist separator are different. Accordingly, in descriptions of the third embodiment, the same reference numerals are assigned to the same portions as those of the first embodiment and second embodiment, and overlapping descriptions thereof are omitted.

Figure 7:
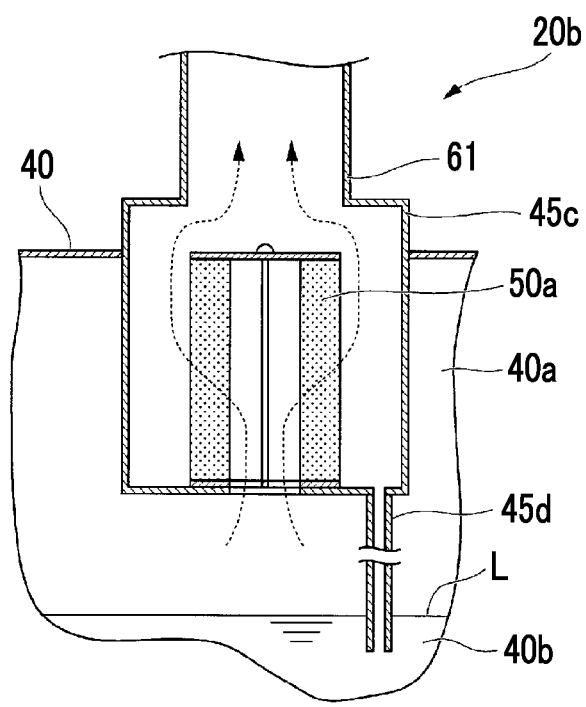
FIG. 7 is a view showing a portion of a configuration of an oil console device in a third embodiment of the present invention.

As shown in FIG. 7, an oil recovery portion 45c of an oil console device 20b of the third embodiment has a bottomed cylindrical shape. A through-hole is formed at a center portion of a bottom portion of the oil recovery portion 45c. In the oil recovery portion 45c, only the through-hole of the bottom portion is open to the gas phase portion 40a inside the oil tank 40, and the upper portion of the oil recovery portion 45c is open to the connection pipe 61. A discharge pipe 45d which extends to the liquid phase portion 40b of the oil tank 40 is provided on the bottom portion of the oil recovery portion 45c.

The discharge pipe 45d extends below the liquid surface of the lubricating oil collected in the oil tank 40. Accordingly, the lubricating oil, which falls on the bottom portion of the oil recovery portion 45c from the oil mist separator 50a, can be returned to the inside of the oil tank 40 through the discharge pipe 45d.

The upper surface and the lower surface of the oil mist separator 50a of the third embodiment are closed and, the oil mist separator 50a is open in the radial direction and is a cylindrical filter which is more elongated than the oil mist separator 50 of the first embodiment. The oil mist separator 50a is disposed inside the oil recovery portion 45c such that the direction in which the oil mist separator 50a extends is a vertical direction. A hollow portion of the oil mist separator 50a is fixed in conformity with the through-hole of the bottom portion of the oil recovery portion 45c. Accordingly, as shown in FIG. 7, the oil mist separator 50a takes in the gas inside the oil tank 40 from the hollow portion via the through-hole. The oil mist separator 50 discharges the taken-in gas from the outer peripheral surface into the oil recovery portion 45c.

According to this configuration, the lubricating oil supplemented by the oil mist separator 50a can fall from the hollow portion into the oil tank 40 via the through-hole. In addition, the lubricating oil dripping from the outer peripheral surface of the oil mist separator 50a falls on the bottom portion of the oil recovery portion 45c and can be fed to the liquid surface inside the oil tank 40 via the discharge pipe 45d.

(Fourth Embodiment)

Next, a fourth embodiment of the oil console device and the rotating machine lubrication system of the present invention will be described. With respect to the oil console device and the rotating machine lubrication system of the first embodiment, in the oil console device and the rotating machine lubrication system described in the fourth embodiment, only some configurations such as the exhaust system of the oil console device, the configuration of the tank pressure regulating section, and the disposition of the oil mist separator are different. Accordingly, in descriptions of the fourth embodiment, the same reference numerals are assigned to the same portions as those of the first to third embodiments, and overlapping descriptions thereof are omitted.

Figure 8:
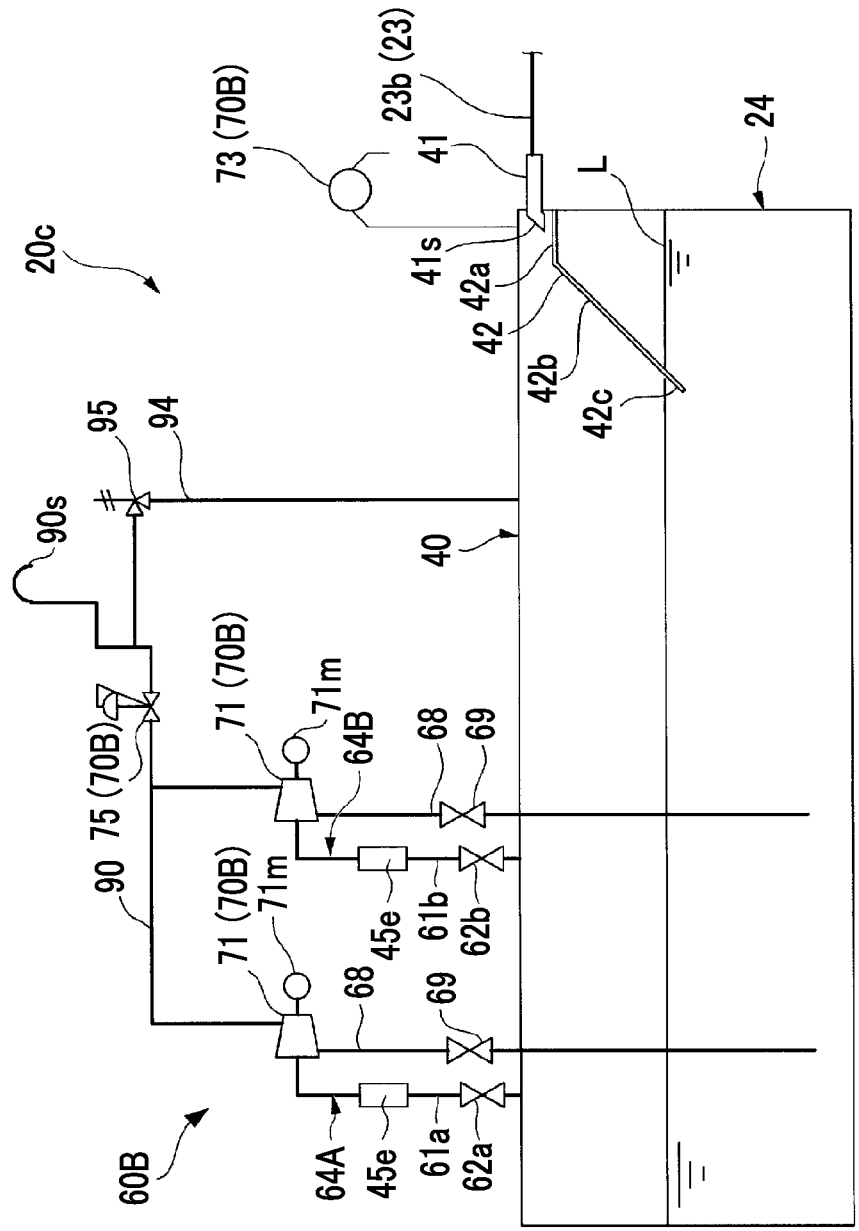
FIG. 8 is a view showing a portion of a configuration of an oil console device in a fourth embodiment of the present invention.

As shown in FIG. 8, an oil console device 20c includes oil recovery portions 45e, an exhaust system 60B, tank pressure regulating sections 70B, and an exhaust pipe 90.

The exhaust system 60B includes a main system 64A and a sub system 64B.

The main system 64A has a main connection pipe (pipe) 61a of which one end is connected to the upper portion of the oil tank 40. In the main connection pipe 61a, the end portion which is not connected to the oil tank 40 is connected to the vapor fan 71 configuring the tank pressure regulating section 70B. A main opening-closing valve 62a is provided in the main connection pipe 61a. It is possible to cause gas inside the oil tank 40 to flow toward the vapor fan 71 by opening the main opening-closing valve 62a.

The sub system 64B has a sub connection pipe (pipe) 61b of which one end is connected to the upper portion of the oil tank 40. In the sub connection pipe 61b, the end portion which is not connected to the oil tank 40 is connected to the vapor fan 71 different from the vapor fan 71 to which the main connection pipe 61a is connected. A sub opening-closing valve 62b is provided in the main connection pipe 61b. It is possible to cause gas inside the oil tank 40 to flow toward the vapor fan 71 by opening the sub opening-closing valve 62b.

In the main system 64A, the oil recovery portion 45e disposed between the main opening-closing valve 62a and the vapor fan 71 is provided to be interposed in the main connection pipe 61a. In the sub system 64B, the oil recovery portion 45e disposed between the sub opening-closing valve 62b and the vapor fan 71 is provided to be interposed in the sub connection pipe 61b. The oil mist separator is provided inside each oil recovery portion 45e.

As the oil mist separator of the present embodiment, various oil mist separators such as a columnar filter having open upper surface and lower surface or a baffle plate-shaped filter are considered. Since a degree of freedom of the disposition or the size of the oil recovery portion 45e increases by arranging the main connection pipe 61a or the sub connection pipe 61b, a degree of freedom of the oil mist separator which can be adopted also increases. The oil mist separator is interposed so as to interrupt the pipe in the middle. Gas can flow in the direction, in which the main connection pipe 61a or the sub connection pipe 61b extends, through the oil recovery portion 45e.

Each of the main system 64A and the sub system 64B is connected to the exhaust pipe 90 on the downstream side of the vapor fan 71.

The vapor fan 71 is driven by the motor 71m. The vapor fan 71 generates a flow from the oil tank 40 side toward the vapor fan 71 side in each of the main system 64A and the sub system 64B, and a negative pressure which is the lower pressure than the pressure inside the oil tank 40 is generated in each of the main system 64A and the sub system 64B.

In the fourth embodiment, the exhaust pipe 90 configures a vent, which discharges the gas such as the misted lubricating oil and the separation gas returned to the oil tank 40 to the outside, along with the exhaust system 60B. In the exhaust pipe 90, a pressure regulating valve (pressure regulating section) 75 configuring a tank pressure regulating section 70B is provided. By regulating the opening degree of the pressure regulating valve 75, the flow rate of the gas inside the main system 64A or the sub system 64B is changed, and it is possible to regulate the pressure inside the main system 64A or the sub system 64B and the pressure inside the oil tank 40.

The exhaust pipe 90 extends upward on the downstream side of the pressure regulating valve 75 and discharges the gas from a tip portion 90s to the outside. The tip portion (exhaust unit) 90s of the exhaust pipe 90 is bent in a U shape so as to open downward.

A bypass pipe 94 of which the lower end is connected to the upper surface of the oil tank 40 is connected to the exhaust pipe 90 on the downstream side of the pressure regulating valve 75. An emergency opening valve 95 including a safety valve, a check valve, a vacuum breaker, or the like is provided in the bypass pipe 94. The emergency opening valve 95 can automatically open when the pressure inside the oil tank 40 increases so as to be equal to or more than a preset reference value. Accordingly, the emergency opening valve 95 supplies the gas inside the oil tank 40 to the tip portion 90s of the exhaust pipe 90 through the bypass pipe 94 so as to perform the discharging, and prevents the pressure inside the oil tank 40 from excessively increasing.

In the oil console device 20c, the main opening-closing valve 62a is open and the sub opening-closing valve 62b is closed. In addition, only the vapor fan 71 on the main system 64A side starts. In this state, the gas (gas phase) inside the oil tank 40 is sucked out from the inside of the oil tank 40 to the main connection pipe 61a by a negative pressure generated by the vapor fan 71 on the main system 64A side. The gas with which oil mist is mixed passes through the oil mist separator positioned in the oil recovery portion 45e provided in the middle of the main connection pipe 61a. Accordingly, a large amount of the mist lubricating oil included in the gas inside the oil tank 40 is separated from the separation gas so as to be recovered. The gas which has passed through the oil mist separator passes through the main system 64A and is discharged from the tip portion 90s of the exhaust pipe 90 to the outside.

In addition, when abnormality occurs in the main system 64A, the main opening-closing valve 62a is closed and the sub opening-closing valve 62b is open. In addition, the vapor fan 71 on the main system 64A side stops and only the vapor fan 71 on the sub system 64B side starts. In this state, the gas (gas phase) inside the oil tank 40 is sucked out from the inside of the oil tank 40 to the sub connection pipe 61b by a negative pressure generated by the vapor fan 71 on the sub system 64B side. The gas with which oil mist is mixed passes through the oil mist separator positioned in the oil recovery portion 45e provided in the middle of the sub connection pipe 61b. Accordingly, a large amount of the mist lubricating oil included in the gas inside the oil tank 40 is separated from the separation gas so as to be recovered. The gas which has passed through the oil mist separator passes through the sub system 64B and is discharged from the tip portion 90s of the exhaust pipe 90 to the outside.

In the oil console device 20c, the tank pressure detection section 73 is provided above the oil tank 40. The main opening-closing valve 62a, the sub opening-closing valve 62b, the pressure regulating valve 75, the motor 71m of the vapor fan 71, or the like is manually operated according to the detection result of the pressure (the differential pressure between the pressure inside the oil tank 40 and the atmospheric pressure) inside the oil tank 40 detected by the tank pressure detection section 73, and the operation state of the recovery portion 24 is regulated. For example, specifically, in a case where the pressure (differential pressure) inside the oil tank 40 detected by the tank pressure detection section 73 exceeds a predetermined reference value, it is possible to determine that a failure of the vapor fan 71 or the pressure regulating valve 75 clogging of the oil mist separator positioned in the oil recovery portion 45e, or the like occurs.

As described above, according to the oil console device 20c and the rotating machine lubrication system 10, since the oil recovery portion 45e included in the oil mist separator is interposed in the middle of the pipe such as the main connection pipe 61a or the sub connection pipe 61b, it is possible obtain a degree of freedom with respect to the size or the installation position of the oil mist separator along with the oil recovery portion 45e.

In addition, it is possible to return the misted lubricating oil and the separation gas to the oil tank 40 along with the lubricating oil which has lubricated the bearing portions 15A to 15D and 16A to 16D, by the negative pressure generated by the vapor fan 71. Since the recovered misted lubricating oil is captured by the oil mist separator positioned in the oil recovery portion 45e, it is possible to clean the exhaust from the oil console device 20c. In this way, it is possible to decrease the discharge amounts of the misted lubricating oil or the separation gas. Moreover, since it is not necessary to provide the vent for directly discharging the misted lubricating oil or the separation gas from the rotating machine main body 11 to the outside, it is possible to reduce a cost of the facility.

Moreover, since the gas which is forcibly sucked by a negative pressure generated by the vapor fan 71 flows to the oil mist separator positioned in the oil recovery portion 45e, it is possible to use a finer mesh element as the oil mist separator. As a result, it is possible to recover the misted lubricating oil which is discharged to the atmosphere in the related art. Since it is possible to recover a larger amount of lubricating oil, it is possible to save the lubricating oil or reduce a work for supplementing the lubricating oil.

Moreover, it is possible to set pressures around the bearing portions 15A to 15D and 16A to 16D inside the rotating machine main body 11 to a negative pressure by the negative pressure generated in the vapor fan 71. Accordingly, it is possible to prevent leakage of the lubricating oil in the seal portions, the flange sections, or the like of the bearing portions 15A to 15D and 16A to 16D.

Moreover, since the pressure regulating valve 75 is provided on the downstream side of the vapor fan 71, it is possible to maintain the pressure inside the oil tank 40 to a constant negative pressure. Accordingly, it is possible to prevent the pressure of the separation gas inside the casing 14 of the rotating machine main body 11 from excessively increasing. As a result, it is possible to prevent the pressures of the bearing portions 15A to 15D and 16A to 16D from increasing.

In addition, since the emergency opening valve 95 automatically opens when the pressure of the oil tank 40 increases to be equal to or more than the preset reference value so as to discharge the gas inside the oil tank 40 from the tip portion 90s to the outside via the bypass pipe 94 or the exhaust pipe 90, in a case where a failure of the vapor fan 71 or the flow rate regulating section 72, clogging of the oil mist separator, or the like occurs, it is possible to prevent the pressure inside the oil tank 40 from excessively increasing. If the pressure of the oil tank 40 increases, the lubricating oil or the separation gas may not be discharged from the sub drain pipe 23a of the recovery passage 23. In this case, there is a concern that a separation flow of the separation gas, inflow of the lubricating oil into the rotating machine main body 11, or the like occurs in the rotating machine main body 11. Meanwhile, it is possible to prevent the pressure inside the oil tank 40 from excessively increasing by providing the bypass pipe 94 and the emergency opening valve 95. Therefore, it is possible to prevent the separation flow of the separation gas and the inflow of the lubricating oil into the rotating machine main body 11 from occurring.

(Other Embodiments)

Moreover, the present invention is not limited to the above-described embodiments, and the design can be modified within a scope which does not depart from the gist of the present invention.

For example, the configuration, the use, or the like of the rotating machine main body 11 is not limited at all. In addition, the dispositions or the number of the bearings lubricated by the oil console devices 20, 20a, 20b, and 20c are not limited at all.

Moreover, the rotating machine main body 11 of the rotating machine lubrication system 10 of the present embodiment is not limited to the steam turbine 13 or the compressor 12 such as a centrifugal compressor, and may be a gas turbine or a motor.

INDUSTRIAL APPLICABILITY

Since the pressure reducing fan reduces the pressure inside the oil tank such that the pressure becomes a negative pressure, the gas inside the oil tank passes through the oil mist separator, and the misted lubricating oil is captured. Accordingly, it is possible to prevent a large amount of misted lubricating oil from flowing into the fan side.

REFERENCE SIGNS LIST

10: rotating machine lubrication system
11: rotating machine main body
12: compressor
12d: thrust collar
12r: compressor rotor (rotating body)
13: steam turbine
13d: thrust collar
13r: turbine rotor (rotating body)
14: casing
15A, 15B: radial bearing (bearing portion)
15C, 15D: thrust bearing (bearing portion)
16A, 16B: radial bearing (bearing portion)
16C, 16D: thrust bearing (bearing portion)
17: connection shaft
20, 20a, 20b, 20c: oil console device
21: oil supply source
22: oil supply passage
22a: main supply pipe
22b: sub supply pipe
23: recovery passage
23a: sub drain pipe
23b: main drain pipe
24: recovery portion
40: oil tank
41: drain nozzle
41s: nozzle tip portion
42: degassing tray
42a: horizontal portion
42b: inclined portion
42c: lower end portion
45, 45a, 45b, 45c, 45e: oil recovery portion
45d: discharge pipe
50, 50a: oil mist separator
60A, 60B: exhaust system
61: connection pipe
62: three-way valve (exhaust switching portion)
62a: main opening-closing valve
62b: sub opening-closing valve
63A, 64A: main system
63B, 64B: sub system
63s: tip portion (exhaust unit)
66: filter
68: return pipe
69: opening-closing valve
70A, 70B: tank pressure regulating section
71: vapor fan (pressure reducing fan)
71m: motor
72: flow rate regulating section (pressure regulating section)
73: tank pressure detection section
75: pressure regulating valve (pressure regulating section)
80: control unit
90: exhaust pipe
90s: tip portion (exhaust unit)
94: bypass pipe
95: emergency opening valve

The invention claimed is:

1. An oil console device, comprising:
an oil tank which includes a receiving portion which receives lubricating oil which has lubricated a bearing portion supporting a rotating body and a separation gas supplied to the bearing portion, and stores the lubricating oil which is recovered through the receiving portion;
a pressure reducing fan which is connected to the oil tank and reduces a pressure inside the oil tank such that the pressure becomes a negative pressure;
an oil mist separator which is provided to be closer to the oil tank side than the pressure reducing fan and captures the misted lubricating oil;
an oil transfer pump which transfers the lubricating oil stored in the oil tank;
an exhaust unit which discharges gas inside the oil tank to the outside on a downstream side of the pressure reducing fan;
a plurality of the pressure reducing fans;

an exhaust switching portion which switches a discharge destination of the gas inside the oil tank to any one of the plurality of pressure reducing fans; and a tank pressure detection section which detects a pressure inside the oil tank;

wherein in a case where a pressure inside the oil tank detected by the tank pressure detection section exceeds a predetermined threshold value, the exhaust switching portion switches the discharge destination of the gas coming from inside the oil tank.

2. The oil console device according to claim 1, further comprising:

an oil recovery portion which is provided in a gas phase portion of the oil tank, wherein the oil mist separator is provided in the oil recovery portion.

3. The oil console device according to claim 2, wherein the oil recovery portion is provided at a position protruding from an upper portion of the oil tank.

4. The oil console device according to claim 1, further comprising:

an oil recovery portion which is provided in a pipe which is connected to an upper portion of the oil tank, wherein the oil mist separator is provided in the oil recovery portion.

5. A rotating machine lubrication system, comprising:

a rotating machine main body to which lubricating oil and a separation gas are supplied and which includes a bearing portion supporting a rotating body; and the oil console device according to claim 1 which is connected to the rotating machine main body and recovers the lubricating oil discharged from the rotating machine main body, wherein a discharge portion which discharges gas recovered from the inside of the rotating machine main body along with the lubricating oil to the outside is only the discharge portion which is provided in the oil console device.

* * * * *